(No Model.)
T. S. BALLARD.
TRACE FASTENER.
No. 592,757. Patented Nov. 2, 1897.
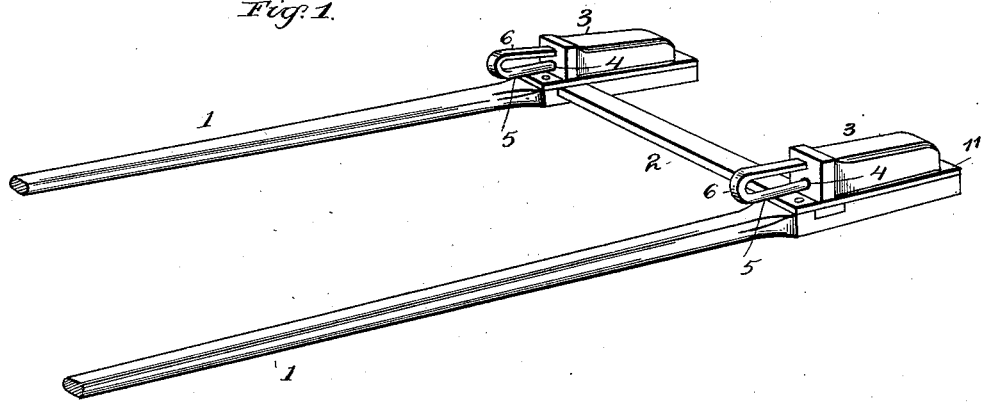
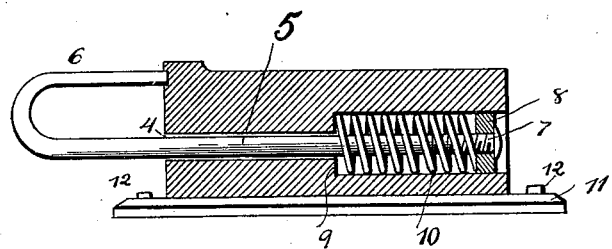
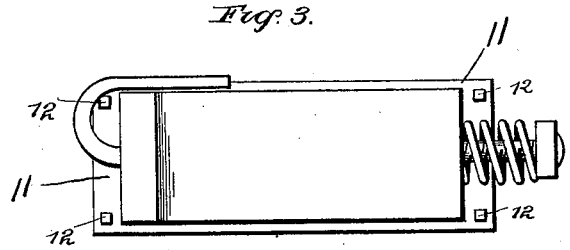
Witnesses
Victor J. Evans.
G. M. Standiford
Inventor
Thomas S. Ballard.
by John Wedderburn
Attorney

UNITED STATES PATENT OFFICE.

THOMAS S. BALLARD, OF GLENWOOD SPRINGS, COLORADO.

TRACE-FASTENER.

SPECIFICATION forming part of Letters Patent No. 592,757, dated November 2, 1897.

Application filed January 7, 1897. Serial No. 618,369. (No model.)

*To all whom it may concern:*

Be it known that I, THOMAS S. BALLARD, a citizen of the United States, residing at Glenwood Springs, in the county of Garfield and State of Colorado, have invented certain new and useful Improvements in Trace-Fasteners; and I do hereby declare the following to be a full, clear, and exact description of the invention, such as will enable others skilled in the art to which it appertains to make and use the same.

This invention relates to trace-fasteners for vehicles, and has for its object to dispense with the ordinary whiffletree and to provide in lieu thereof springs having provision for attachment of the traces, whereby the latter are yieldingly attached to the shafts.

The detailed objects and advantages of the invention will be pointed out in the course of the ensuing description.

The invention consists in certain novel features and details of construction, as hereinafter fully described, illustrated in the drawings, and incorporated in the claims.

In the accompanying drawings, Figure 1 is a perspective view of a pair of shafts, showing the improved trace-fasteners applied thereto. Fig. 2 is an enlarged longitudinal section through one of the said fastening devices, showing the manner of mounting the same. Fig. 3 is a detail plan view of a portion of the shafts, showing the trace-fastener and the means for adjusting the tension of the spring which yieldingly supports the fastener.

Similar numerals of reference designate corresponding parts in the several figures of the drawings.

Referring to the drawings, 1 designates a pair of shafts, of any ordinary construction, connected adjacent to the rear ends with the cross-bar 2, which by reason of the present invention may be made much lighter than the ordinary cross-bar, as no strain is produced thereon by the whiffletree, to which the animal is attached, the whiffletree being dispensed with under the present arrangement. Secured to the upper side of each of the shafts 1, at a point near the cross-bar 2, is a metal block or casing 3, provided with a throughbore 4, the forward portion of which is reduced to receive the shank 5 of the sliding hook 6. The bore 4 for the greater part of its length is squared, as indicated at 7, so as to receive a nut 8 on the threaded rear end of the shank 5 of the sliding hook. By reducing the forward end of the bore 4 a shoulder 9 is provided, and between said shoulder 9 and the nut 8 is interposed a spiral spring 10, said spring being disposed around the shank 5 of the sliding hook.

The block or casing 3 is provided with a base-flange 11, which extends beyond the ends of the block, where it is provided with openings for the reception of bolts or other fasteners 12, which pass through said flange and also through the shaft 1 for securing the device to the latter. The tension of the spring may be adjusted by turning the hook 6 downward into a horizontal position, so that the hook will pass to one side of the block or casing 3, which will allow the shank 5 to be slid backward, thereby carrying the nut 8 out of the rear end of the casing, as in Fig. 3, whereupon said nut may be turned for tightening or loosening the spring. If desired, the threaded portion of the shank 5 may be left so that the nut 8 may be removed; but if it is desired to prevent the nut from becoming loose the rear end of the shank 5 may be mashed or headed. By reason of the nut fitting snugly within the squared portion of the bore it cannot work loose from the shank 5 and the shank can only turn a limited distance in the nut when the hook 6 will contact with the base-flange 11 and prevent its further turning. By means of the construction above described the whiffletree is dispensed with, together with the rattle incident thereto. The invention also does away with center draft, and the cross-bar 2 may be made much lighter, as no strain is put thereon by the draft-animal.

The trace-fasteners are less expensive than the whiffletree and enable the shafts to be made materially lighter. The liability of the cross-bar 2 becoming broken by the whiffletree is also overcome.

Having thus described the invention, what I claim as new, and desire to secure by Letters Patent, is—

1. A trace-fastener comprising a casing having a flat-sided longitudinal bore reduced at one end to form a shoulder, a hook having its shank slidingly mounted in said casing, a flat-sided nut threaded upon said shank and sliding in the flat-sided portion of the bore, and a spring interposed between said nut and shoulder, substantially as described.

2. A trace-fastener comprising a casing having a longitudinal flat-sided bore reduced at one end to form an internal shoulder, a hook having its shank slidingly mounted in said bore, a flat-sided nut fitted upon said shank and adapted to slide in the squared portion of the bore, and a spring surrounding said shank and interposed between said shoulder and nut, the arrangement being such that the hook may be turned so as to extend outside of the casing upon one side thereby enabling the hook to be moved back for withdrawing the nut from the bore, substantially as described.

In testimony whereof I have signed this specification in the presence of two subscribing witnesses.

THOMAS S. BALLARD.

Witnesses:
JAMES E. WILSON,
U. E. WILLIAMS.